US012381061B2

(12) United States Patent
Watanabe et al.

(10) Patent No.: US 12,381,061 B2
(45) Date of Patent: Aug. 5, 2025

(54) FUSE

(71) Applicant: PACIFIC ENGINEERING CORPORATION, Gifu (JP)

(72) Inventors: Kengo Watanabe, Gifu (JP); Yutaka Tsuchiya, Gifu (JP)

(73) Assignee: Pacific Engineering Corporation, Gifu (JP)

( * ) Notice: Subject to any disclaimer, the term of this patent is extended or adjusted under 35 U.S.C. 154(b) by 59 days.

(21) Appl. No.: 18/039,817

(22) PCT Filed: Dec. 1, 2021

(86) PCT No.: PCT/JP2021/044029

§ 371 (c)(1),
(2) Date: Jun. 1, 2023

(87) PCT Pub. No.: WO2022/176315

PCT Pub. Date: Aug. 25, 2022

(65) Prior Publication Data

US 2024/0021397 A1 Jan. 18, 2024

(30) Foreign Application Priority Data

Feb. 18, 2021 (JP) ................................ 2021-023910

(51) Int. Cl.
*H01H 85/38* (2006.01)

(52) U.S. Cl.
CPC ....... *H01H 85/38* (2013.01); *H01H 2085/388* (2013.01); *H01H 2231/026* (2013.01)

(58) Field of Classification Search
CPC ............ H01H 2231/026; H01H 85/38; H01H 85/383; H01H 2085/388; H01H 85/08–12
See application file for complete search history.

(56) References Cited

U.S. PATENT DOCUMENTS 3,400,235 A * 9/1968 Howard .............. H01H 85/042 337/229
3,866,318 A * 2/1975 Kozacka ............... H01H 85/08 29/423
4,479,105 A 9/1984 Banes
(Continued)

FOREIGN PATENT DOCUMENTS

CN 112331539 2/2021
JP 45-028139 B1 9/1970
(Continued)

OTHER PUBLICATIONS

WO PCT/JP2021/044029 Search Rprt., Feb. 8, 2022, Pacific Engineering Corp.
(Continued)

*Primary Examiner* — Jacob R Crum
(74) *Attorney, Agent, or Firm* — Wells St. John P.S.

(57) ABSTRACT

A fuse with an improved arc elimination performance is provided while an increase in the total length of the fuse element is prevented. A fuse 500 includes a fuse element 100 including at least one fusing portion 120 between terminal portions 110 on both sides. The fuse element 100 includes curved portions 130, which are hollowed, at positions adjacent to the fusing portion 120. An arc-eliminating material 140 is fastened in hollowed portions 131 of the curved portions 130.

4 Claims, 4 Drawing Sheets

(56) References Cited

U.S. PATENT DOCUMENTS

| | | | | |
|---|---|---|---|---|
| 4,608,548 | A | 8/1986 | Borzoni | |
| 5,808,253 | A | 9/1998 | Hatakeyama | |
| 6,281,782 | B1 | 8/2001 | Morimoto | |
| 10,483,070 | B1 * | 11/2019 | Beckert | H01H 69/02 |
| 10,535,485 | B2 | 1/2020 | Ando et al. | |
| 10,553,387 | B1 | 2/2020 | Angelini | |
| 2003/0076214 | A1 * | 4/2003 | Ackermann | H01H 85/38 337/296 |
| 2007/0159291 | A1 | 7/2007 | Wilniewczyc | |
| 2008/0137253 | A1 | 6/2008 | George | |
| 2015/0137934 | A1 | 5/2015 | von zur Muehlen | |
| 2015/0348732 | A1 * | 12/2015 | Douglass | H01H 85/175 337/198 |
| 2017/0309432 | A1 | 10/2017 | Lell | |
| 2018/0122606 | A1 | 5/2018 | Ando et al. | |
| 2018/0277325 | A1 | 9/2018 | De Palma | |
| 2019/0371561 | A1 | 12/2019 | Ehrhardt | |
| 2020/0035437 | A1 | 1/2020 | Gaudinat | |
| 2021/0159035 | A1 | 5/2021 | Koprivsek | |
| 2022/0148832 | A1 | 5/2022 | Kube | |
| 2022/0189723 | A1 | 6/2022 | Shi | |
| 2022/0199346 | A1 * | 6/2022 | Yoneda | H01H 85/08 |
| 2022/0246377 | A1 | 8/2022 | Gerlaud | |
| 2023/0066646 | A1 | 3/2023 | Nakatani | |
| 2023/0386777 | A1 | 11/2023 | Kondo | |
| 2024/0258055 | A1 | 8/2024 | Kondo | |

FOREIGN PATENT DOCUMENTS

| | | | |
|---|---|---|---|
| JP | S57-210537 | | 12/1982 |
| JP | 59-169029 | | 9/1984 |
| JP | H07-57613 | | 3/1995 |
| JP | H08279327 | | 10/1996 |
| JP | 10-241546 | | 9/1998 |
| JP | 2000215769 | | 8/2000 |
| JP | 2000-251599 | | 9/2000 |
| JP | 2001110293 | | 4/2001 |
| JP | 2002-163974 | | 6/2002 |
| JP | 2007-527602 | | 9/2007 |
| JP | 3164185 | | 11/2010 |
| JP | 2011-60687 | | 3/2011 |
| JP | 2014-049272 | | 3/2014 |
| JP | 2014534584 | | 12/2014 |
| JP | 2015-065156 | | 4/2015 |
| JP | 2017-010823 | | 1/2017 |
| JP | 2017-117565 | | 6/2017 |
| JP | 2017-517095 | | 6/2017 |
| JP | 2017-531910 | | 10/2017 |
| JP | 2020-506515 | | 2/2020 |
| JP | 2021-051989 | | 4/2021 |
| JP | 2021-061146 | | 4/2021 |
| JP | 2021/517342 | | 7/2021 |
| JP | 2021-170522 | | 10/2021 |
| JP | 2022-095112 | | 6/2022 |
| JP | 2023-000054 | | 1/2023 |
| WO | WO 2013-054920 | | 4/2013 |
| WO | WO 2016-199656 | | 12/2016 |
| WO | WO 2017-110160 | | 6/2017 |
| WO | WO 2019/181469 | A1 | 9/2019 |
| WO | WO 2019/235082 | A1 | 12/2019 |
| WO | WO 2020/189377 | A1 | 9/2020 |
| WO | WO 2020/196294 | A1 | 10/2020 |
| WO | WO 2020/204154 | A1 | 10/2020 |
| WO | WO 2021/131535 | A1 | 7/2021 |
| WO | WO 2021/220588 | A1 | 11/2021 |
| WO | WO 2023/218715 | A1 | 11/2023 |
| WO | WO 2024/042813 | A1 | 2/2024 |
| WO | WO 2024/111167 | A1 | 5/2024 |

OTHER PUBLICATIONS

WO PCT/JP2021/044029 Writ. Opin., Feb. 8, 2022, Pacific Engineering Corp.
WO PCT/JP2022/018346 S/R English, Jun. 28, 2022, Pacific Engineering Corp.
WO PCT/JP2022/018346 Wtn Opn Engl, Jun. 28, 2022, Pacific Engineering Corp.
WO PCT/JP2022/031283 S/R English, Nov. 1, 2022, Pacific Engineering Corp.
WO PCT/JP2022/031283 Wtn Opn, Nov. 1, 2022, Pacific Engineering Corp.
WO PCT/JP2023/005346 S/R Engl Tra, May 9, 2023, Pacific Engineering Corp.
WO PCT/JP2023/016995 S/R Engl Tra, Jun. 27, 2023, Pacific Engineering Corp.
WO PCT/JP2023/021075 S/R Eng, Aug. 1, 2023, Pacific Engineering Corp.
WO PCT/JP2023/025806 S/R Eng Tran, Aug. 29, 2023, Pacific Engineering Corp.
WO PCT/JP2023/027483 S/R Eng Tran, Sep. 12, 2023, Pacific Engineering Corp.

* cited by examiner

FUSE

CROSS REFERENCE TO RELATED APPLICATION

This is a 35 U.S.C. § 371 application of, and claims priority to, International Application No. PCT/JP2021/044029, filed on Dec. 1, 2021, which was published as WO2022/176315 on Aug. 25, 2022, and which claims priority to JP Patent Application No. 2021-023910, which was filed on Feb. 18, 2021, the teachings of which are incorporated herein by reference.

TECHNICAL FIELD

The present invention relates to a fuse mainly used in an automobile electric circuit or the like.

BACKGROUND ART

Fuses have been conventionally used to protect an electric circuit mounted on an automobile or the like, and various electrical equipment connected to the electric circuit. More specifically, in a case where unintended overcurrent flows through the electric circuit, a fusing portion of a fuse element incorporated in the fuse fuses due to heat generated by the overcurrent to protect the various electrical equipment to prevent an excessive current from flowing through the various electrical equipment.

There are various types of fuses depending on the applications, but in order to avoid occurrence of an arc between the terminal portions on both sides after a fusing portion fuses, devices, such as increasing the distance between the terminal portions, are necessary, and there is a problem that the total length of the fuse element increases.

SUMMARY OF INVENTION

Technical Problems

Accordingly, the present invention provides a fuse with an improved arc elimination performance while preventing an increase in the total length of the fuse element.

Solutions to Problems

A fuse according to the present invention is a fuse including a fuse element including at least one fusing portion between terminal portions on both sides. The fuse element includes curved portions, which are hollowed, at positions adjacent to the fusing portion. An arc-eliminating material is fastened in hollowed portions of the curved portions.

According to the above features, the energy of an arc that occurs during fusing of the fusing portion is effectively consumed by the arc-eliminating material in the hollowed portions of the curved portions, and the arc elimination performance is improved. Therefore, the distance between the terminal portions can be shortened, and an increase in the total length of the fuse element can be prevented.

In addition, in the fuse according to the present invention, the arc-eliminating material may be fastened only to the curved portions that are closest to the corresponding terminal portions.

According to the above feature, the arc-eliminating material is fastened only to the curved portions that are each closest to the terminal portions on both sides, so that the arc elimination performance is maintained, while the number of places where the arc-eliminating material is installed can be reduced, and the manufacturing cost of the fuse can be reduced.

In addition, in the fuse according to the present invention, the arc-eliminating material may be silicone.

According to the above feature, the fuse has a high arc elimination performance.

Advantageous Effects of Invention

As described above, according to a fuse of the present invention, it is possible to improve the arc elimination performance while preventing an increase in the total length of the fuse element.

BRIEF DESCRIPTION OF DRAWINGS

FIG. 1(*b*) is an overall perspective view of the fuse.

FIG. 2(*b*) is a side view of the fuse.

REFERENCE SIGNS LIST

Figure 1A:
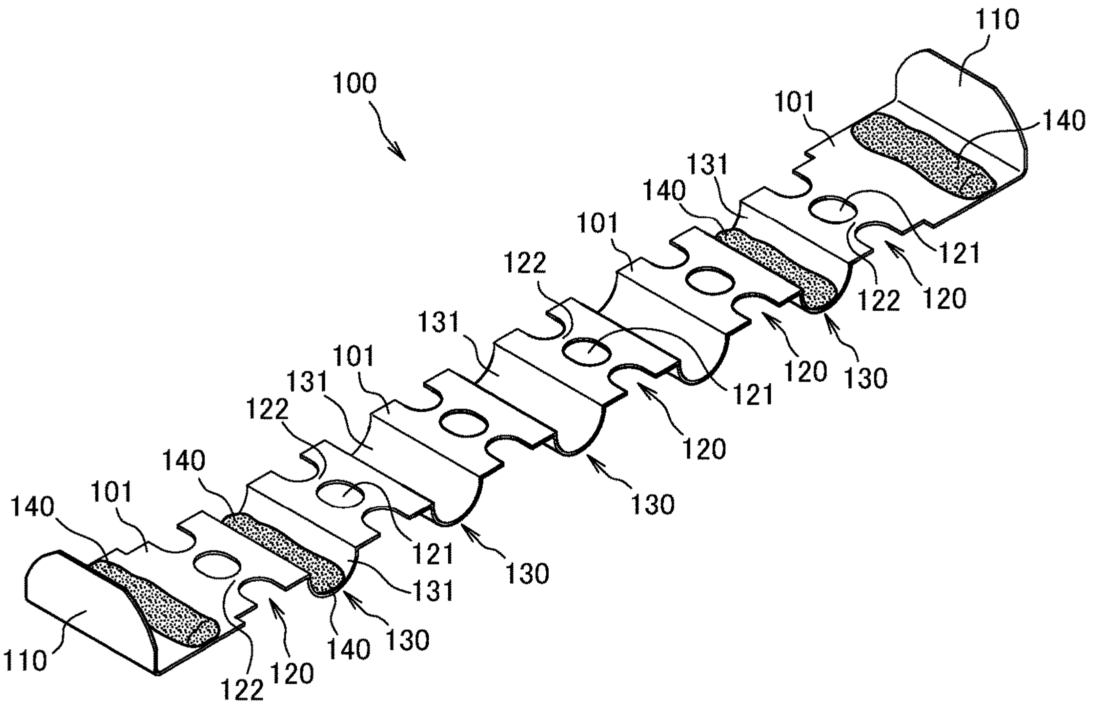
FIG. 1(*a*) is an overall perspective view of a fuse element housed in a fuse according to the present invention.

100 fuse element
110 terminal portion
120 fusing portion
130 curved portion
131 hollowed portion
140 arc-eliminating material
500 fuse

DESCRIPTION OF EMBODIMENT

Hereinafter, an embodiment of the present invention will be described with reference to the drawings. Note that the shape, material, and the like of each member of the fuse in the embodiment described below are merely examples, and are not limiting. Note that the "up-down direction" described in this specification is a direction perpendicular to a lengthways direction of the fuse element.

Figure 1B:
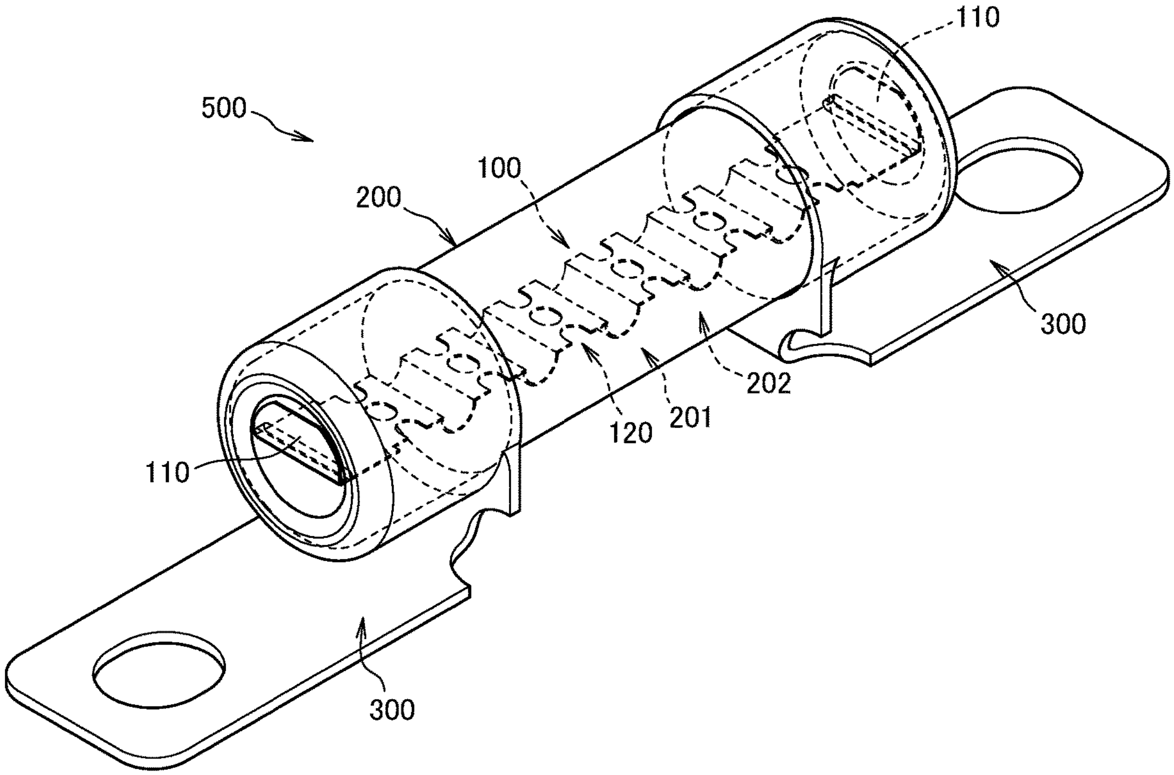
Figure 2A:
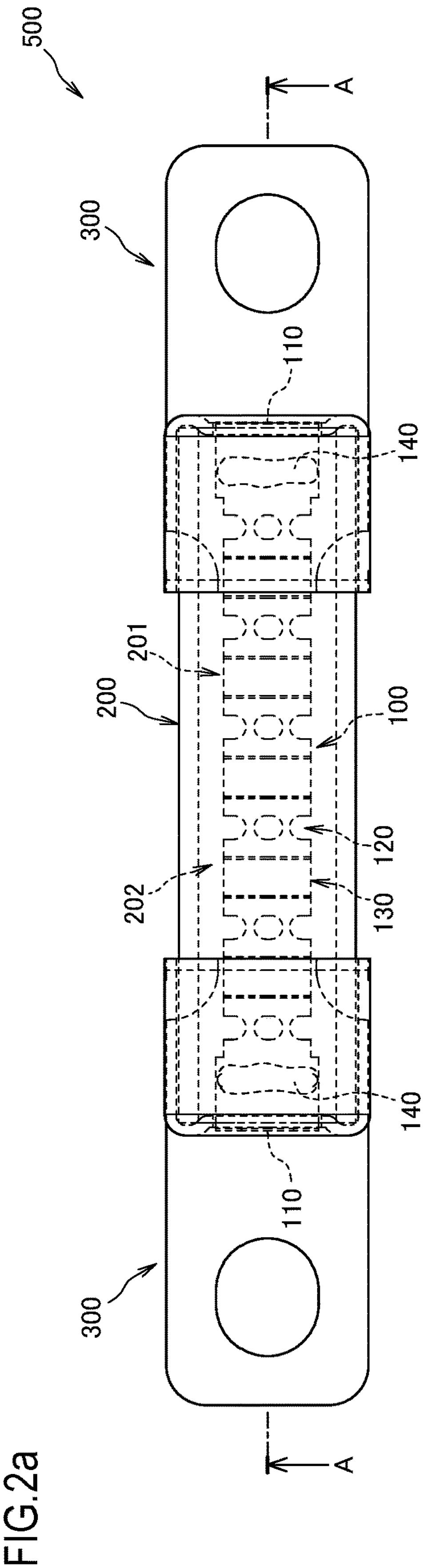
FIG. 2(*a*) is a plan view of the fuse.
Figure 2B:
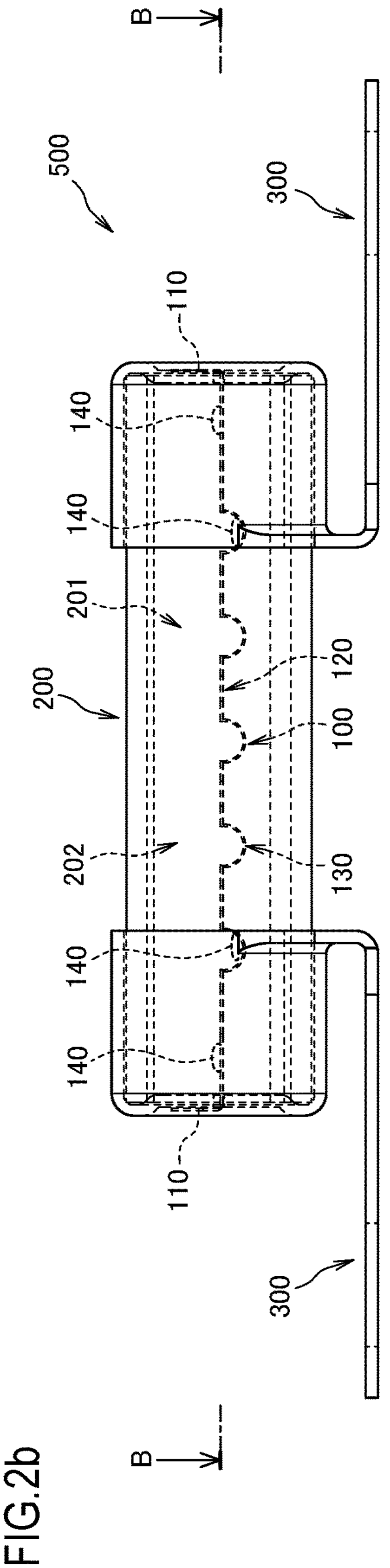
Figure 3:
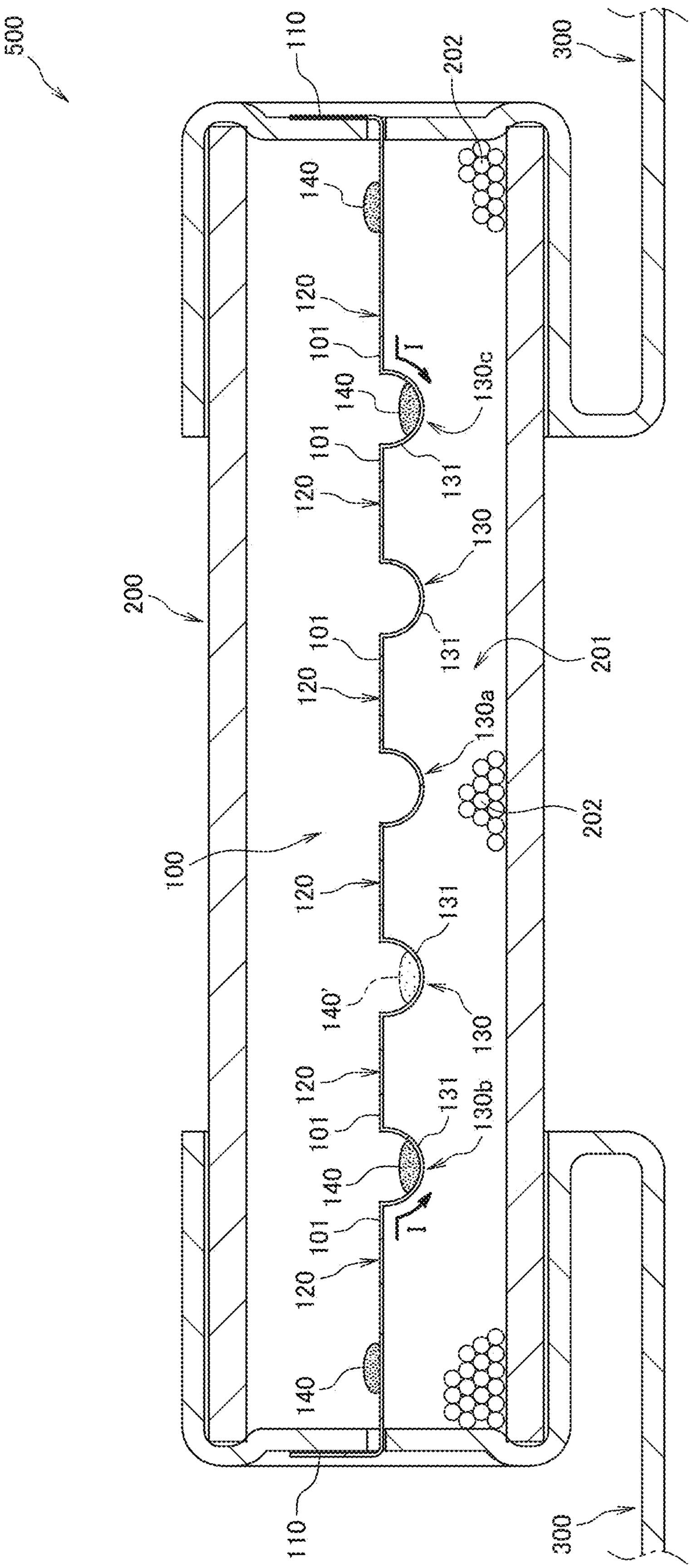
FIG. 3 is a cross-sectional view taken along line A-A illustrated in FIG. 2(*a*).
Figure 4:
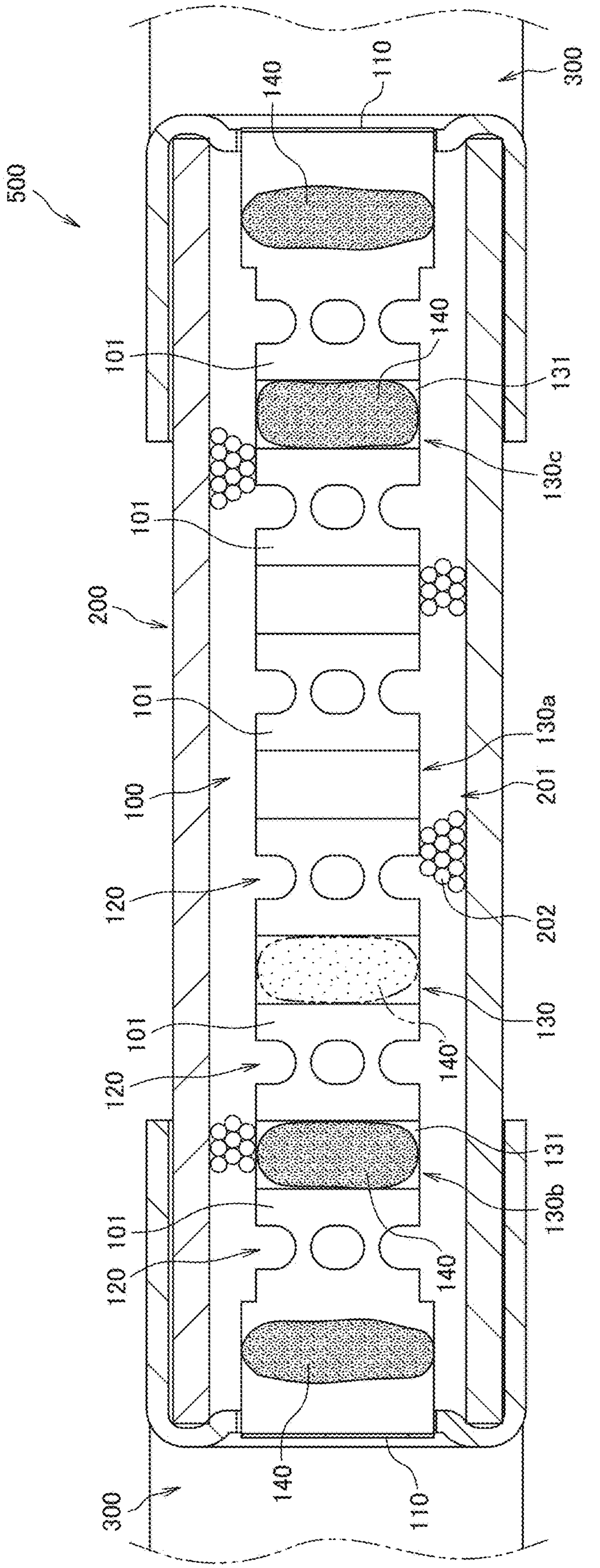
FIG. 4 is a cross-sectional view taken along line B-B illustrated in FIG. 2(*b*).

FIG. 1(*a*) is an overall perspective view of a fuse element 100 housed in a fuse 500 according to the present invention. FIG. 1(*b*) is an overall perspective view of the fuse 500. Further, FIG. 2(*a*) is a plan view of the fuse 500. FIG. 2(*b*) is a side view of the fuse 500. FIG. 3 is a cross-sectional view taken along line A-A illustrated in FIG. 2(*a*). FIG. 4 is a cross-sectional view taken along line B-B illustrated in FIG. 2(*b*).

As illustrated in FIG. 1(*a*), the fuse element 100 is formed of a thin conductive plate made of copper or another alloy, and includes a pair of terminal portions 110, a plurality of fusing portions 120 located between the terminal portions 110, and curved portions 130 adjacent to the fusing portions 120. The fusing portion 120 includes a narrow portion 122, which is part of the fuse element 100 that has a narrower width and has a small hole 121, which makes the width even narrower. When unintended overcurrent flows through an electric circuit or the like, the narrow portion 122 generates heat and fuses so that the fusing portion 120 cuts off the overcurrent.

Further, the curved portion 130 is formed by curving part of the fuse element 100 in a downward hollowed shape, and includes a hollowed portion 131. The fusing portions 120 are provided for a flat main-body portion 101 of the fuse element 100. The hollowed portions 131 of the curved portions 130 are hollowed downward from the main-body portion 101.

As described above, the fuse element 100 includes, in the main-body portion 101 extending linearly, the plurality of fusing portions 120 and the plurality of curved portions 130 at positions adjacent to the fusing portions 120. The respective fusing portions 120 are connected in series. Further, the curved portion 130 extends across the main-body portion 101 between the fusing portions 120 in the width direction. The fusing portions 120 and the curved portions 130 are alternately arranged. Further, the fuse element 100 is provided with the six fusing portions 120 and the five curved portions 130. Note that the fuse element 100 is provided with but is not limited to the six fusing portions 120. Any number of fusing portions 120, such as one fusing portion 120 or two or more fusing portions 120, can be provided.

Note that the fuse element 100 is not limited to the shape illustrated in FIG. 1(*a*), and may have any shape as long as the fuse element 100 includes fusing portions 120 connected in series, and curved portions 130 at positions adjacent to the fusing portions 120. Further, any number of fusing portions 120 and curved portions 130 can also be provided. In addition, the fusing portion 120 is not limited to being constituted by the narrow portion 122 as illustrated in FIG. 1(*a*), and may have any configuration, such as forming a fusing portion by locally reducing the thickness of the fuse element 100, as long as the fusing portion can generate heat and fuse when unintended overcurrent flows through an electric circuit or the like.

Further, an arc-eliminating material 140 is fastened on the surface of the main-body portion 101 between the terminal portion 110 and the fusing portion 120. Further, the arc-eliminating material 140 is fastened in the hollowed portions 131 of the curved portions 130. This arc-eliminating material 140 is silicone (polymer including, as the skeleton, siloxane bonds composed of silicon and oxygen, and including organic groups mainly composed of methyl groups (—CH3) and bonded to silicon (Si)) applied and fastened to the surfaces of the hollowed portions 131. Since the arc-eliminating material 140 is solid, the arc-eliminating material 140 is in close contact with and does not move from the surfaces of the hollowed portions 131. The arc-eliminating material 140 has a high density and a high arc elimination performance. Note that since the arc-eliminating material is constituted by silicone, the arc-eliminating material 140 has a high arc elimination performance, and since the arc-eliminating material 140 is an insulator, the arc-eliminating material 140 can prevent carbonization due to a short-circuit current. Further, the arc-eliminating material 140 is constituted by but is not limited to silicone. The arc-eliminating material 140 can be formed of any material as long as the material is a solid material that is fastened in the hollowed portions 131 and has an arc elimination effect.

Further, in a state where the fuse element 100 is housed in a housing space 201 inside an insulating casing 200, the housing space 201 is optionally filled with an arc-eliminating material 202. As the arc-eliminating material 202, a granular material made of silica sand ($SiO_2$), or the like can be used. Further, since the arc-eliminating material 140 is solid, the arc-eliminating material 140 is a member that has a higher density than the density of the arc-eliminating material 202. Since the arc-eliminating material 140 is a member that has a higher density than the density of the arc-eliminating material 202, the arc-eliminating material 140 can more effectively eliminate an arc that occurs, as described later. However, the housing space 201 is optionally filled with the arc-eliminating material 202, so that the arc-eliminating material 202 existing around the fusing portions 120 eliminates the arc, and the arc elimination performance is further improved. Note that although the entire housing space 201 is filled with the arc-eliminating material 202, only part of the arc-eliminating material 202 is illustrated in the drawings.

Further, as to the fuse 500, the terminal portions 110 of the fuse element 100 are connected and fixed to connection terminals 300 made of a conductive metal, such as copper or a copper alloy, in a state where the fuse element 100 is housed in the casing 200. The fuse 500 is used by connecting the connection terminals 300 to an electric circuit mounted on an automobile or the like. When unintended overcurrent flows through the electric circuit, a fusing portion 120 in the fuse 500 generates heat and fuses to cut off the electric circuit.

Here, when the fusing portion 120 generates heat and fuses, a high voltage is applied to the terminal portions 110 on both sides connected to the electric circuit, and thus, in the main-body portion 101 around the fusing portion 120, an arc due to a short-circuit current may occur in a portion remaining without fusing. However, since the curved portions 130 are provided at positions adjacent to the fusing portions 120, an arc I is guided to detour along the curved portions 130 as illustrated in FIGS. 3 and 4. The energy is consumed by the curved portions 130 that increase the physical distance, and further the energy of the arc I is effectively consumed by the arc-eliminating material 140 in the hollowed portions 131 of the curved portions 130, and the arc is effectively eliminated. Note that since the curved portions 130 are formed by curving part of the fuse element 100, the curved portions 130 are a conductor and easily guide the arc I.

On the other hand, in a related art, in order to avoid occurrence of an arc between terminal portions on both sides after a fusing portion fuses, devices, such as increasing the distance between the terminal portions, are necessary, and the total length of the fuse element increases. However, in the present invention, since the curved portions 130 are provided at positions adjacent to the fusing portions 120, and the arc-eliminating material 140 is fastened in the hollowed portions 131 of the curved portions 130, the energy of the arc I during fusing of the fusing portion 120 is effectively consumed, and the arc elimination performance is improved. Therefore, for the fuse 500 of the present invention, the distance between the terminal portions 110 on both sides can be shortened, and an increase in the total length of the fuse element 100 can be prevented. Further, even in a case where the fuse 500 includes the plurality of fusing portions 120, the spaces between the fusing portions 120 can be narrowed since the curved portions 130 can effectively eliminate an arc, and an increase in the total length of the fuse element 100 can be prevented.

Further, the arc-eliminating material 140 is fixed and housed only in the hollowed portions 131 of the curved portions 130. That is, part of the arc-eliminating material 140 does not overflow the hollowed portions 131 to the main-body portion 101. Therefore, the arc I is reliably guided to detour along the curved portions 130, and the energy is effectively consumed by the arc-eliminating material 140 in the hollowed portions 131 of the curved portions 130. If part of the arc-eliminating material 140 overflowed from the hollowed portion 131 and protruded to the main-body portion 101, the arc-eliminating material 140 that overflows from the hollowed portion 131 would be carbonized by heat during fusing of the fusing portion 120 provided for the main-body portion 101, and during arc elimination. As a result, there is a possibility that between both sides of the main-body portion 101 that sandwich the curved portion 130, an arc I flows straight the shortest distance via the carbonized portion of the arc-eliminating material 140, and does not detour to the curved portion 130.

Further, the arc-eliminating material 140 is fastened to each of the two curved portions 130 on both sides of the fuse element 100, but is not limited thereto. The arc-eliminating material 140 can be fastened to any of the curved portions 130, such as fastening the arc-eliminating material 140 to only one of the plurality of curved portions 130, or fastening the arc-eliminating material 140 to all the curved portions 130. For example, as illustrated in FIGS. 3 and 4, in a case where an arc-eliminating material 140 and an arc-eliminating material 140' are fastened to two adjacent curved portions 130, the arc-eliminating material 140 and the arc-eliminating material 140' are separated from each other and physically independent from each other. If the arc-eliminating material 140 and the arc-eliminating material 140' were physically continuous so as to straddle a fusing portion 120, the arc-eliminating material 140 and the arc-eliminating material 140', which are physically continuous, would be carbonized by heat during fusing of the fusing portion 120, and during arc elimination. Therefore, the arc-eliminating material 140 and the arc-eliminating material 140' are separated from each other and physically independent from each other, to prevent the carbonization.

Further, as shown in FIGS. 3 and 4, in a case where there are three or more curved portions 130 adjacent to fusing portions 120, an arc-eliminating material 140 may not be fastened to a hollowed portion 131 of a curved portion 130 (in FIGS. 2 and 3, a curved portion 130*a*) located between curved portions 130 to which the arc-eliminating material 140 is fastened. Even if a fusing portion 120 adjacent to the curved portion 130*a* fuses, the curved portion 130 to which the arc-eliminating material 140 is fastened exists between the fusing portion 120 and the terminal portion 110, and thus the energy is consumed by the arc-eliminating material 140 of the curved portion 130, and the arc is eliminated.

Note that if in the fuse 500, a fusing portion 120 that will fuse can be identified in advance, the position where the arc will occur can also be identified, and the arc-eliminating material 140 can be optimally arranged in a specific curved portion 130. However, depending on the state of an electric circuit connected to the fuse 500, it is not determined which fusing portion 120 will fuse, and thus, it is also not possible to identify the position where the arc will occur. Therefore, it is also difficult to optimally arrange the arc-eliminating material 140.

Accordingly, as illustrated in FIGS. 3 and 4, the arc-eliminating material 140 may be fastened only to a curved portion 130*b* and a curved portion 130*c* each closest to the terminal portions 110 on both sides (that is, the arc-eliminating material 140 is not fastened to curved portion 130 except the curved portion 130*b* and the curved portion 130*c*). Even if a fusing portion 120 fuses, and the arc occurs at any position between the terminal portions 110 on both sides, the arc that occurs between the terminal portions 110 on both sides is effectively eliminated on both sides by the arc-eliminating material 140 of the two curved portions (130*b* and 130*c*) since the two curved portions (130*b* and 130*c*) to which the arc-eliminating material 140 is fastened exist between the terminal portions 110 on both sides. For example, even if a fusing portion 120 far from the terminal portions 110 on both sides, that is, a fusing portion 120 near the substantially center of the fuse element 100 fuses, the arc traveling toward the terminal portions 110 is effectively eliminated by the arc-eliminating material 140 of the plurality of curved portions (130*b* and 130*c*) before reaching the terminal portions 110, and thus, the arc-eliminating material 140 may not be provided for curved portions 130 adjacent to fusing portions 120 far from the terminal portions 110 on both sides. As described above, the arc-eliminating material 140 is fastened only to the curved portions (130*b* and 130*c*) each closest to the terminal portions 110 on both sides, so that the arc elimination performance is maintained, while the number of places where the arc-eliminating material 140 is installed can be reduced, and the manufacturing cost of the fuse 500 can be reduced.

Note that the arc-eliminating material 140 may also be optionally fastened to the main-body portion 101 located between the terminal portion 110 and a fusing portion 120 adjacent to the terminal portion 110, and even when an arc occurs near the terminal portion 110, the arc can be effectively eliminated. Further, although the curved portions 130 are hollowed downward from the fusing portions 120 of the main-body portion 101, the curved portions 130 are not limited thereto, and may be hollowed upward from the fusing portions 120 of the main-body portion 101. Further, although the arc-eliminating material 140 is fastened to the entire hollowed portions 131 of the curved portions 130 in the width direction, the arc-eliminating material is not limited thereto, and may be partially fastened to the hollowed portions 131. Further, although the curved portions 130 are curved in a semicircular shape in a side view, the curved portions 130 are not limited thereto, and may be curved in any shape, such as a substantially triangular shape or a quadrangular shape, in a side view as long as the shape is hollowed to form hollowed portions 131.

Further, a fuse of the present invention is not limited to the above embodiment, and various modifications and combinations can be made within the scope of the claims and the scope of the embodiment, and these modifications and combinations are also included in the scope of the right.

The invention claimed is:

1. A fuse comprising a fuse element including at least one fusing portion between terminal portions on both sides, wherein the fuse element includes curved portions, which define hollowed portions, at positions adjacent to the fusing portion, and an arc-eliminating material is applied only on an internal surface of the hollowed portions and fastened in the hollowed portions of the curved portions.

2. The fuse according to claim 1, wherein the arc-eliminating material is fastened only to the curved portions that are closest to the corresponding terminal portions.

3. The fuse according to claim 1, wherein the arc-eliminating material is silicone.

4. The fuse according to claim 2, wherein the arc-eliminating material is silicone.

* * * * *